Figure 1:
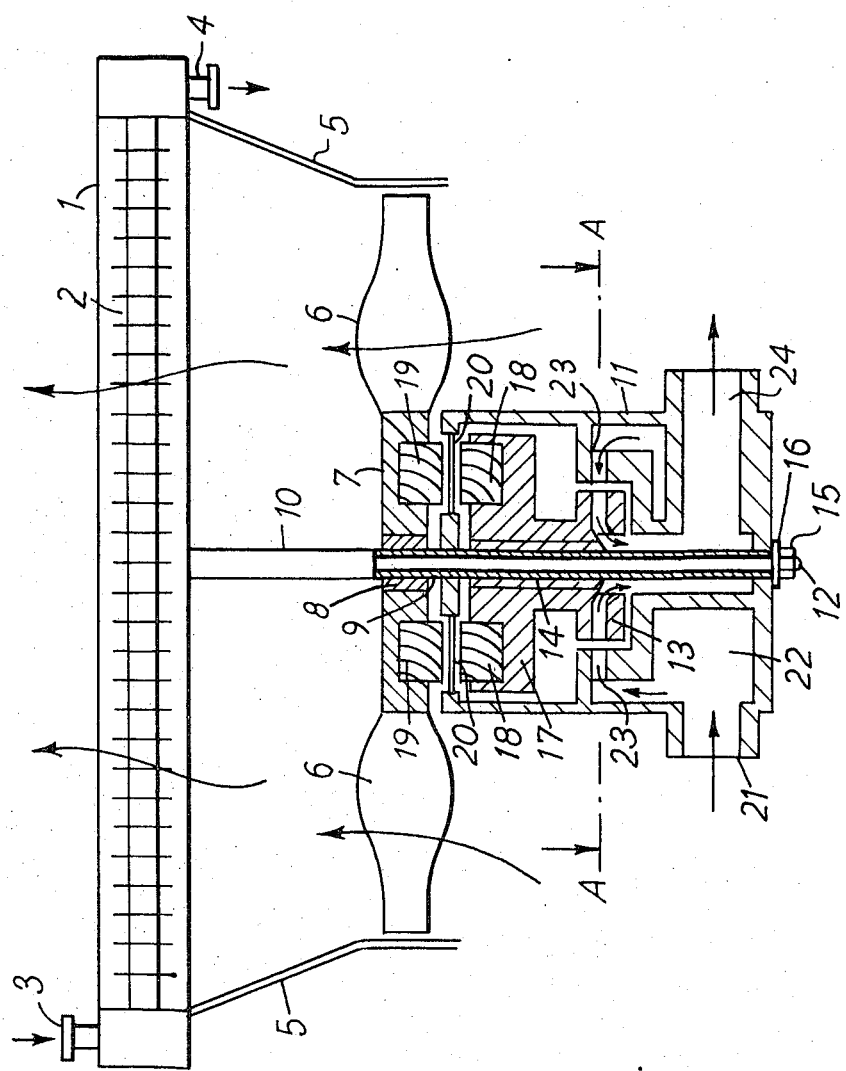

United States Patent [19]
Murphy

[11] 3,860,064
[45] Jan. 14, 1975

[54] RELATING TO GAS-MOVING DEVICE
[75] Inventor: Edmund Murphy, La Spezia, Italy
[73] Assignee: Rückluft Patent AG, Lucerne, Switzerland
[22] Filed: Apr. 13, 1973
[21] Appl. No.: 350,759

[30] Foreign Application Priority Data
May 12, 1972  Great Britain................... 22524/72

[52] U.S. Cl................. 165/121, 417/417, 417/420, 310/104, 192/84 PM
[51] Int. Cl........................... F24h 3/06, H02k 5/10
[58] Field of Search .......... 417/417, 420, 223, 374; 165/122; 192/84 PM, 3.21; 310/103, 104

[56]     References Cited
         UNITED STATES PATENTS
2,692,759  10/1954  Swenson et al..................... 165/120
2,937,803   5/1960  Cunningham....................... 417/420
3,420,184   1/1969  Englesberg et al............. 310/104 R
3,520,642   7/1970  Fulton................................. 417/420
3,680,984   8/1972  Young et al....................... 310/104

FOREIGN PATENTS OR APPLICATIONS
403,271  12/1968  Australia............................. 417/420

Primary Examiner—Charles J. Myhre
Assistant Examiner—Theophil W. Streule, Jr.
Attorney, Agent, or Firm—Baldwin, Wight & Brown

[57]         ABSTRACT

A gas-moving device comprising a fan, a fluid operated drive for rotatably driving the fan, and a magnetic coupling for drivingly coupling the drive to the fan; and a heat-exchange apparatus incorporating such device.

7 Claims, 3 Drawing Figures

RELATING TO GAS-MOVING DEVICE

This invention relates to a gas-moving device which is particularly adapted for use, for example, with fluid-cooling apparatus, such as a heat exchanger. The invention is also particularly concerned with a gas-moving device, in the form of a fan or propeller adapted to be driven by fluid-operated driving means, for example, a water turbine, which device is operatively combined with one or more heat exchangers, particularly air-cooled extended surface, e.g. finned tube, heat exchangers.

In prior cooling apparatus, the driving means, e.g. an electric motor or a hydraulic motor, is usually directly coupled to the fan or propeller, either by mounting the motor and the fan on a common shaft rotatable by said motor or by mounting each on a separate, rotatable shaft, the two shafts being coupled to one another by means of suitable gearing or belting. In the case of a hydraulic motor either arrangement requires the provision of fluid seals or packing between the relatively rotating parts, which seals are liable to prove inefficient in use and require frequent replacement if leakage of driving fluid is to be avoided or kept to a minimum.

The present invention provides apparatus which not only overcomes the aforesaid disadavantage but also is simple and efficient.

In accordance with the present invention there is provided a gas-moving device comprising a fan, a fluid operated drive for rotatably driving the fan, and a magnetic coupling for drivingly coupling the drive to the fan. Preferably the said coupling comprises a first magnet attached to the drive and a second magnet attached to the fan, the disposition of the first and second magnets being such that rotation of the first magnet by the drive causes rotation of the second magnet and the fan attached thereto. Alternatively one of the coupling members may be made from a non-magnetised ferromagnetic material. Preferably, a fixed and leak-free diaphragm is mounted between the drive and the fan and the said magnets transmit a magnetic force across the diaphragm.

The gas-moving device described above is particularly adapted for moving a cooling gas, especially air, over heat exchangers, more particularly air-cooled extended surface, e.g. finned tube, heat exchangers and accordingly the invention also provides an apparatus for removing heat from fluids which comprises a finned tube or matrix adapted to allow the flow therethrough of the fluid to be cooled, in operative combination with a gas-moving device as described above.

In the gas-moving device according to the invention the drive for the fan is preferably in the form of a water turbine, the rotor of which may be mounted for rotation around a tube carried by the stationary fan hub support. The stationary support for the fan hub preferably comprises a fixed rod or shaft, located above and passing through the aforesaid turbine rotor-carrying tube.

The second cooperating magnet, preferably in the form of a ring permanent magnet, is advantageously attached to the hub of the fan and the first magnet preferably comprises a ring magnet carried by the turbine rotor.

The leak-free diaphragm may comprise a flat disc cover member through the centre of which depends the turbine-carrying tube and the peripheral edge of which engages and is sealed to the casing of the water turbine, e.g. by welding.

Figure 2:
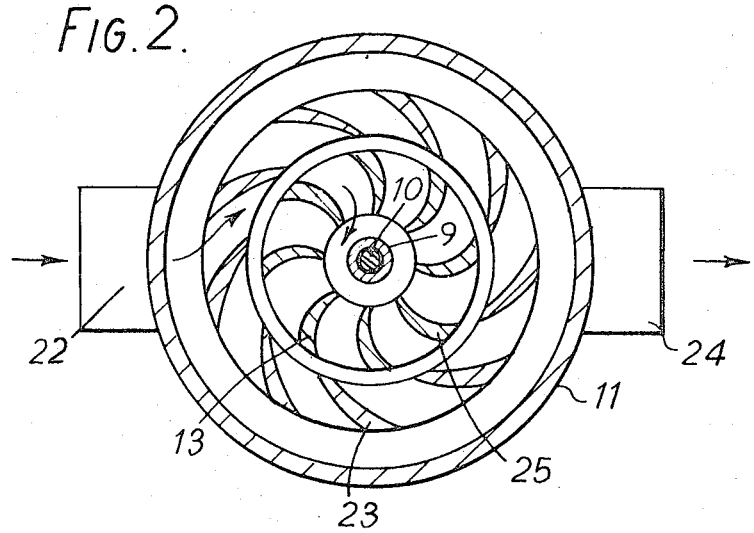
Figure 3:
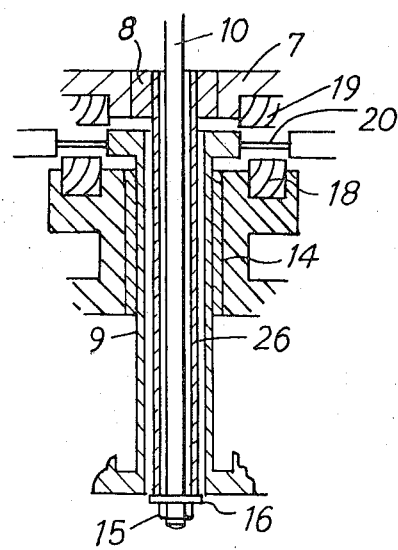

The invention will now be particularly described with reference to the accompanying drawings which illustrate a preferred embodiment of the apparatus comprising a finned tube heat exchanger and a gas-moving device and in which:

FIG. 1 is a side elevation of the apparatus showing the gas-moving device in section, FIG. 2 is a section through line A—A of FIG. 1, and FIG. 3 is a part section through the centre of a modification of the device of FIG. 1.

The apparatus illustrated in FIG. 1 of the accompanying drawings comprises a heat exchanger 1 containing a plurality of finned tubes 2 and having an inlet 3 and outlet 4 for the fluid to be cooled. Attached to the heat exchanger is a plenum chamber defined by wall 5 which permits cooling air moved by fan blades 6 to pass across the finned tubes in either direction.

The fan blades 6, are attached to a hub 7 which is rotatably mounted through a bearing 8 on a tube 9 about a fixed shaft 10 which is attached at its upper end to the mounting of the heat exchanger, passes through the casing 11 of a water fluid operated driver chamber and terminates at end 12. The tube 9 may or may not be cemented to the casing 11. Mounted within the casing 11 is a turbine 13, in this case a water-turbine of the "Francis" type, which rotates on the tube 9 through a bearing 14. The casing is held in position around the fixed shaft by a nut 15 and washer 16 on the shaft end 12.

The turbine driving member, as shown a rotor 17, carries a magnet in the form of a ring 18. A second magnet 19, which may be in the form of a ring is housed in the hub 7 of the fan. The magnets 18 and 19 create a magnetic field across non-magnetic leak-free wall shown as a diaphragm 20 which is fixed and sealingly connected to the casing 11 to form a fluid-tight (e.g. water-tight) seal over the turbine chamber. The magnets act as elements of a magnetic coupling. The elements are of ring shape and are mounted to lie in parallel planes, and are spaced from each other along an axis common to both. The wall or diaphragm 20 is also planar and lies in a plane parallel to the planes of the coupling elements 18 and 19.

In operation water enters the inlet 21, and is distributed from the chamber 22 through the guide vanes 23 into the rotating turbine 13 and discharges via the outlet 24, the direction of flow being indicated in FIG. 1 and FIG. 2 of the drawings by arrows. FIG. 2 illustrates the configuration of the guide vanes 23 and the rotor vanes 25 of the turbine. The rotating turbine 13 rotates the first magnet 18 which in turn rotates the second magnet 19 and thus the fan hub 7 and the fan blades 6, so causing cooling air to pass over the finned tubes 2 in the direction shown by the arrows.

In the modification illustrated in FIG. 3 of the drawings the water-turbine rotates on the tube 9 as in the embodiment of FIG. 1, but the fan hub rotates on an inner tube 26 which is concentric with the tube 9 and the fixed shaft 10.

I claim:

1. A gas moving apparatus comprising a rotatable fan; a fluid casing; a shaft fixed to and extending in said casing; a fluid operated driver having a driving member mounted for rotation on said shaft and within said casing; a magnetic coupling for transmitting drive from said driving member to said fan, said coupling including a first coupling element operatively connected to said driving member and a second coupling element operatively connected to said fan; and a leak-free wall interposed between said first and second elements and closing one end of said casing, said shaft extending through and projecting beyond said leak-free wall, and said fan being mounted for rotation about the projecting part of said shaft.

2. Apparatus according to claim 1 in which said wall comprises a diaphragm of non-magnetic material.

3. Apparatus according to claim 1 in which each of said coupling elements is of ring shape, said coupling elements being mounted to lie in parallel planes, and being spaced from each other along an axis common to both.

4. Apparatus according to claim 3 in which said wall is planar and is interposed between said coupling elements in a plane parallel to the planes of said coupling elements.

5. Apparatus according to claim 3 in which said driver is a water turbine the rotor of which constitutes said driving member.

6. Apparatus according to claim 1 in combination with a heat exchanger positioned in the path of gas discharged by said fan.

7. Apparatus according to claim 1 in combination with a heat exchanger attached to said projecting part of said shaft and positioned in the path of gas delivered by said fan.

* * * * *